United States Patent
Johnson

(10) Patent No.: US 8,607,905 B2
(45) Date of Patent: Dec. 17, 2013

(54) APPARATUS FOR MOVING WHEELED LOADS

(76) Inventor: Dan Johnson, Talco, TX (US)

( * ) Notice: Subject to any disclaimer, the term of this patent is extended or adjusted under 35 U.S.C. 154(b) by 156 days.

(21) Appl. No.: 13/415,320

(22) Filed: Mar. 8, 2012

(65) Prior Publication Data

US 2013/0062128 A1    Mar. 14, 2013

Related U.S. Application Data

(60) Provisional application No. 61/486,095, filed on May 13, 2011.

(51) Int. Cl.
*B62D 49/06* (2006.01)

(52) U.S. Cl.
USPC ........................................ 180/11; 280/43.23

(58) Field of Classification Search
USPC .................. 180/11; 280/43.23, 402; 254/131; 414/495, 426; 244/17.17
See application file for complete search history.

(56) References Cited

U.S. PATENT DOCUMENTS

| | | | |
|---|---|---|---|
| 3,279,722 A | 10/1966 | Glover, Jr. et al. | |
| 4,033,422 A * | 7/1977 | Benning | 180/14.1 |
| 4,223,856 A | 9/1980 | DiVincenzo | |
| 4,488,612 A * | 12/1984 | Patterson | 180/14.1 |
| 4,576,245 A | 3/1986 | Oldani | |
| 5,056,981 A | 10/1991 | Knowles | |
| 5,701,966 A | 12/1997 | Amico | |
| H001767 H * | 1/1999 | Davis et al. | 89/40.01 |
| 6,019,314 A | 2/2000 | Craig | |
| 6,325,403 B1 * | 12/2001 | Brutger | 280/444 |
| 6,739,822 B2 * | 5/2004 | Johansson | 414/427 |
| 7,074,003 B2 | 7/2006 | Klein | |
| 7,607,608 B2 | 10/2009 | Morris et al. | |
| 7,845,670 B2 * | 12/2010 | Oberg | 280/476.1 |
| 8,517,401 B1 * | 8/2013 | Horn et al. | 280/47.15 |

* cited by examiner

Primary Examiner — Tashiana Adams
(74) Attorney, Agent, or Firm — Edward L White

(57) ABSTRACT

Apparatus for moving a wheeled load comprising: a frame having a two end; at least one wheel attached to at least one frame end; drive wheel(s) between the ends; a drive means for providing drive wheel power; a power source; a load-lifting arm means, the lifting arm means having a proximal end rotatably attached to the frame and a distal end; affixed to the distal end is a locking pickup head having a multi-socket center adapted to receive a ball, and a sliding locking gate to releasably affix the head to the ball; extending outwardly from the second end is a handle; disposed on the handle is a control means for operating the apparatus; and drive disengagement means for mechanically disengaging the powered driving mechanism so that a user can manually move the apparatus in case of battery or other mechanical failure.

8 Claims, 4 Drawing Sheets

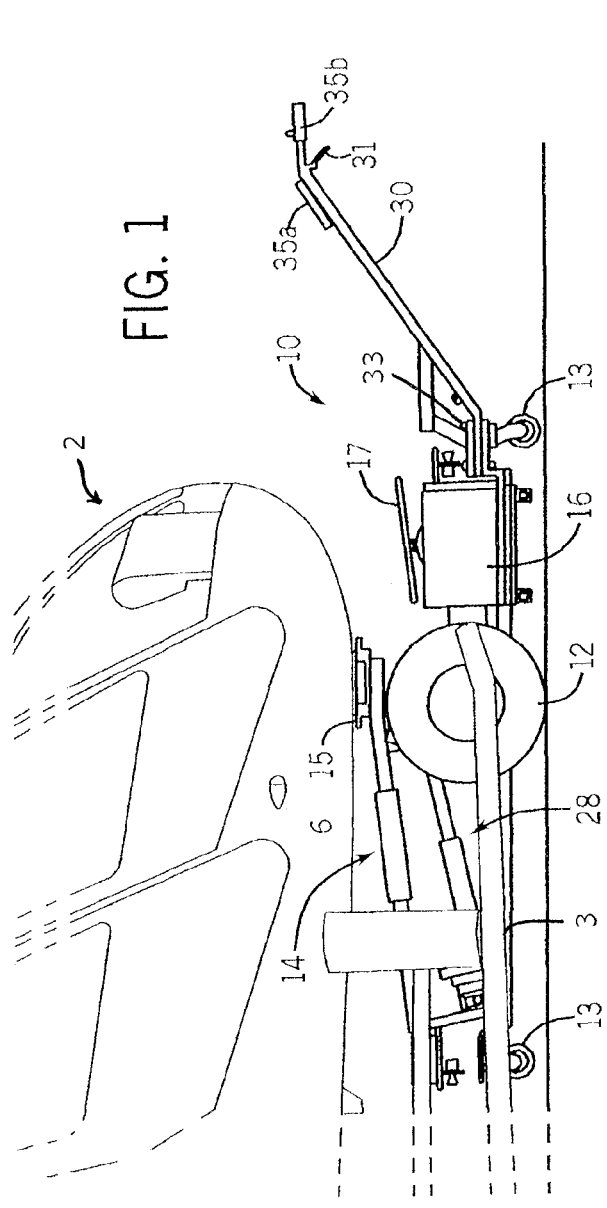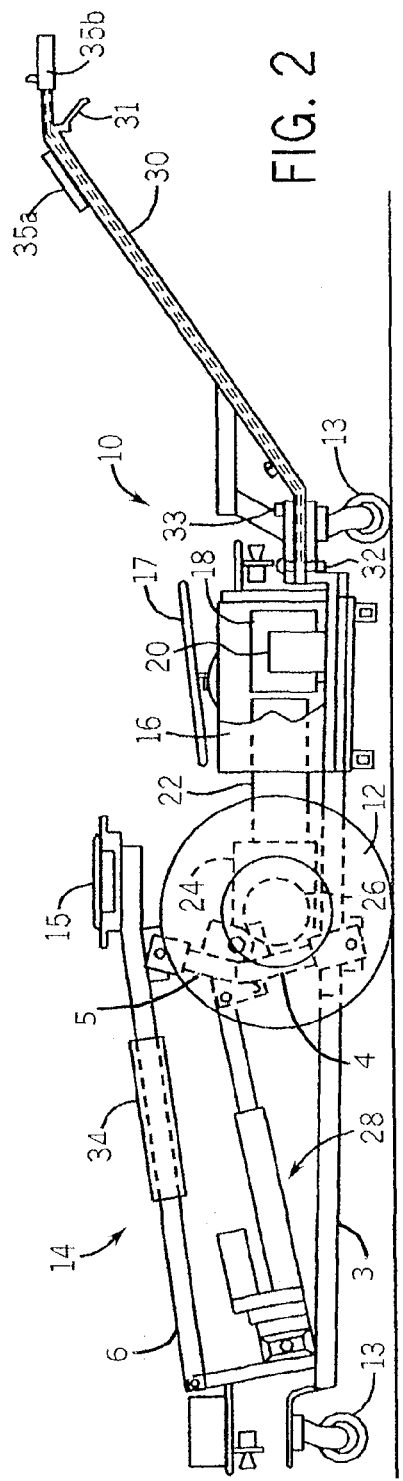

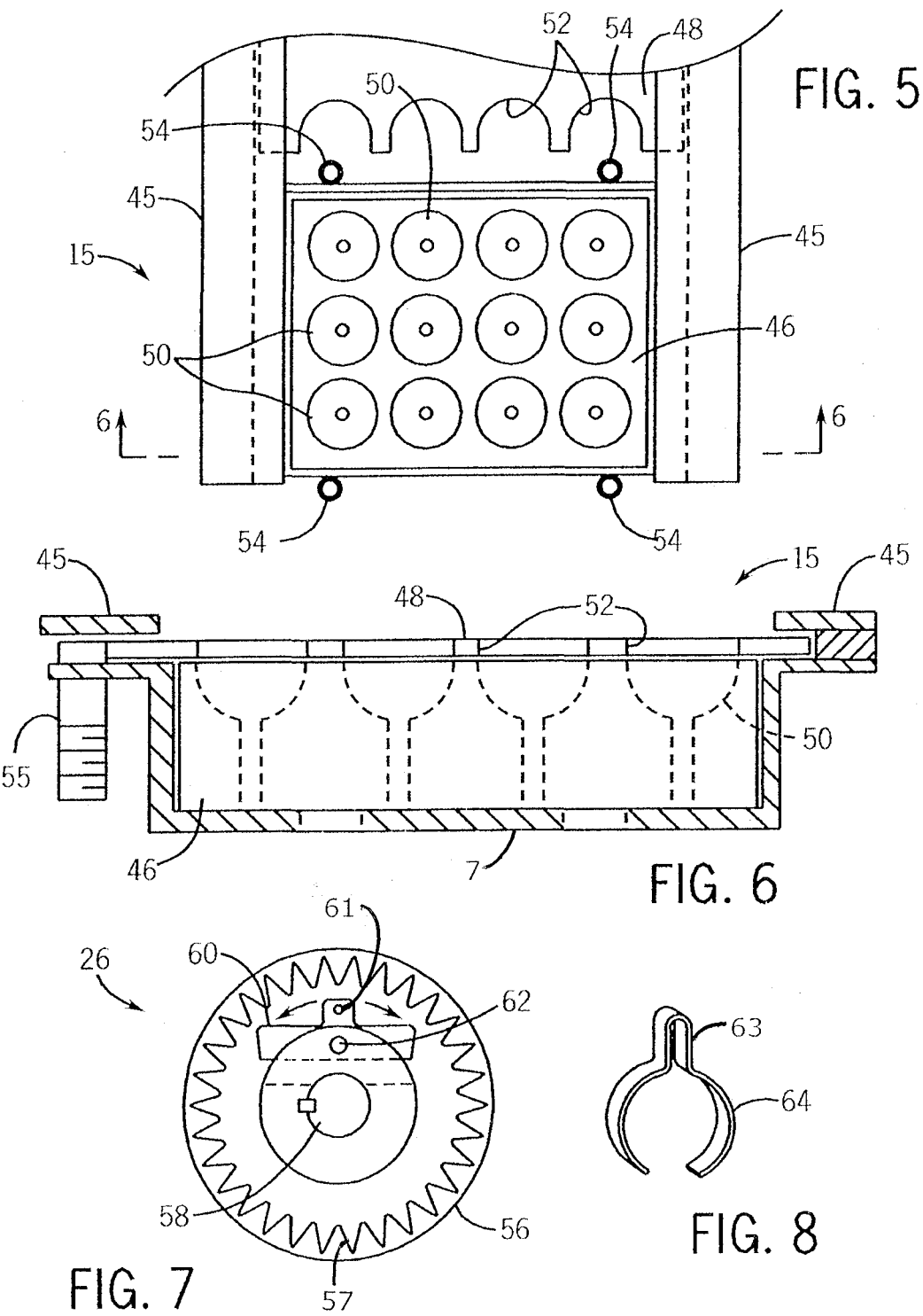

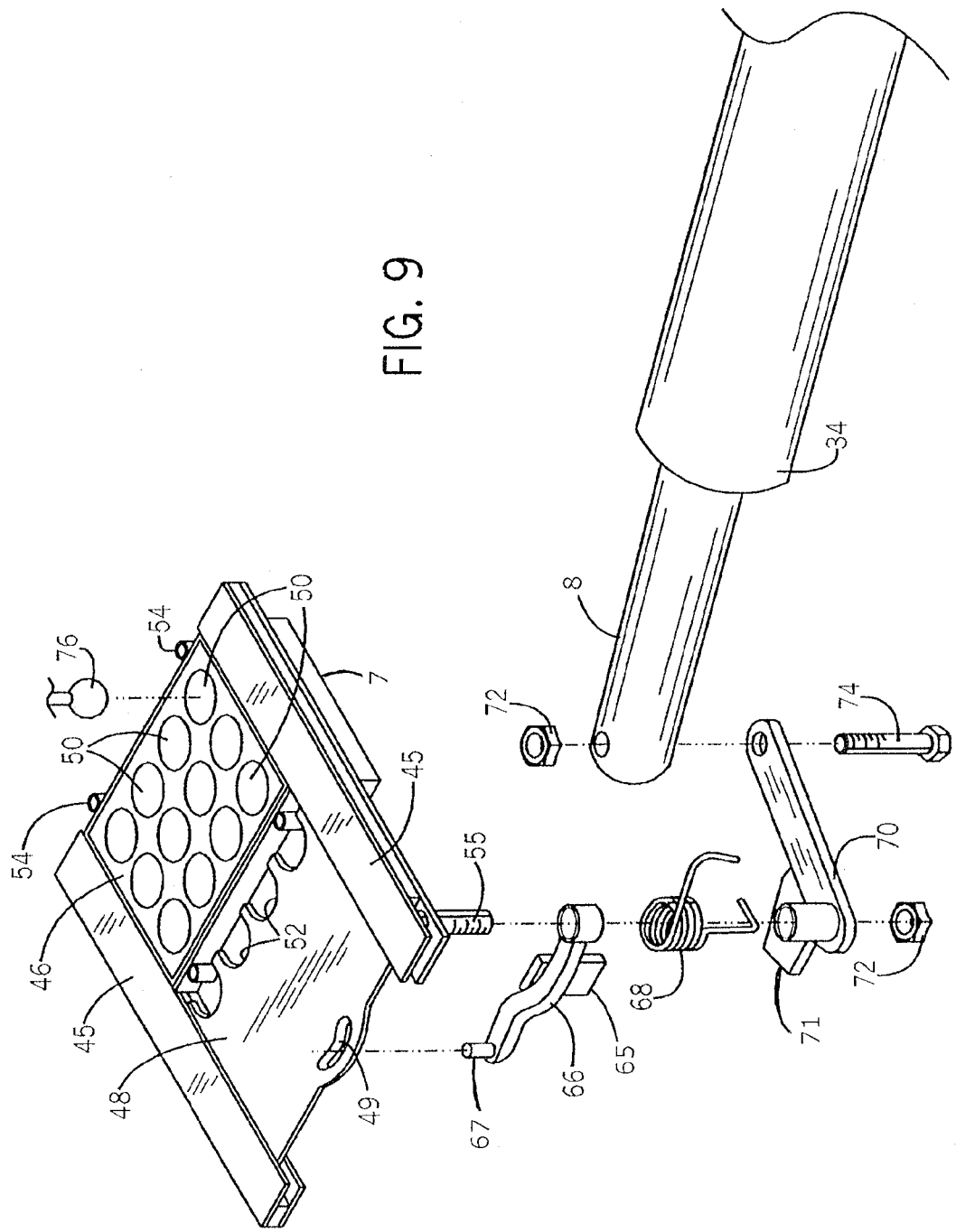

APPARATUS FOR MOVING WHEELED LOADS

CROSS-REFERENCE TO RELATED APPLICATIONS

This application follows on provisional patent application No. 61/486,095 filed on May 13, 2011.

FIELD OF THE INVENTION

The invention relates generally to devices for moving wheeled loads. More particularly, for example, the invention relates to moving helicopters or airplanes around on a ramp or in the hanger.

SUMMARY OF THE INVENTION

It is well known that mechanical means may be required to assist in moving loads such as helicopters on the ground. For simplicity, the invention will be discussed herein predominantly as a tool for moving a helicopter, but it is applicable to movement of any load that can be engaged by the apparatus. The disclosure should not be seen as limited to application for movement of helicopters. A wide variety of prior art devices are available to allow one or more persons to move helicopters on the ground. Prior art devices run the gamut: at one end of the spectrum are very simple devices—essentially floor jacks—that are pushed or pulled by an operator after the devices have lifted the helicopter skids off of the ground; at the other end of the spectrum are large self-powered wheeled vehicles that may be capable of lifting an entire helicopter and transporting it using their own power.

An example of a relatively simple apparatus for moving a helicopter can be seen in U.S. Pat. No. 7,074,003 to Klein. Klein teaches a device with a single wheel that is powered by a motor. The wheel is disposed on a lever arm. At one end of the lever arm is a means for engaging each of the skids on a helicopter, and at the other end is a handle. Using the advantage of the lever arm, a user can lift the helicopter, which is then poised on the single wheel. Power applied through the wheel allows a user to move a helicopter as desired.

At the other end of the spectrum is the laboriously titled "omnidirectional self-propelled vehicle for ground handling of equipment" taught by Amico in U.S. Pat. No. 5,701,966. The Amico vehicle has a front chassis rotatably connected to a rear chassis for relative tilting movement in a plane transverse to a longitudinal vehicle axis. Each chassis is supported by a pair of independently driven omnidirectional wheels for movement of the vehicle over the ground in any azimuthal direction. Mounted on the rear chassis is a lift assembly of adjustable transverse width for engaging the skids with the lifting elements and lifting the equipment to an elevated position for transport over the ground. A stabilizer assembly of adjustable transverse width is also mounted on the rear chassis, but extends through and in front of the front chassis for engaging the skids with the stabilizing elements to prevent fore/aft teetering movement of the elevated equipment.

Prior art devices failed to provide the elegant, balanced approach to ground movement of wheeled loads such as helicopters of the present invention. Prior art devices were either too cumbersome and costly, such as Amico, or too simple and narrowly-tailored such as Klein to be usable with a wide range of wheeled loads and in a variety of settings. Other problems were also presented by prior art devices such as either being too difficult to attach to a helicopter or, on the other hand, failing to provide a secure enough connection to ensure that a helicopter did not disengage and fall off of them.

In the present invention, the frame provides the backbone for attachment of other components. The drive motor and gearbox, the lift motor and actuator and the lock motor and actuator are mounted to the frame in a manner allowing free movement at the correct pivot points. In a preferred embodiment, a caster wheel is affixed to the frame near a first end with a handle extending outward from the frame at a second end. The purpose of the caster wheel includes steadying the apparatus and possibly providing additional support. The steadying wheel need not be a caster-type wheel, and it need not be attached at or near an end of the frame. However, it will often be desirable to use caster wheels near an end as they are omnidirectional, and placing them near an end of the frame provides maximum stability/steadying. A controller and associated switches is secured to the handle.

Affixed to the frame between the two ends of the frame is at least one, and preferably at least two, drive wheels. The drive wheels are preferably equipped with an automatic neutral hub that slides over the axles. A battery or batteries are set in respective boxes affixed to the frame, and they supply the power for all operation if the apparatus. An optional scissor jack in the front portion of the frame and the special hubs provide the ability for the unit to be of use manually should power be lost.

In operation, a user activates the on switch to power up the apparatus. If an optional positionable handle is provided, an operator adjusts it to give the best view of the helicopter to be moved. A user then rotates the throttle in the desired direction of movement. Once in front of the helicopter, a user rotates the throttle toward the helicopter to move the apparatus under the front of the helicopter. Then a user moves the lift switch in the up position and watches the guide lights shining on the bottom of the helicopter through the mirror to guide the unit so a lift head is under a ground handling ball mounted on the bottom of the helicopter. Preferably, the lift head is a "bees hive" configuration defining multiple sockets therein to receive a ball, which configuration provides for easier connection of the head to a ball. The user continues to lift up the front of the helicopter until at least the front of the helicopter skids are off the ground.

A user next rotates the throttle in the direction they wish to move the helicopter. A user can move the throttle a small amount to creep slowly or rotate to its full travel to move the helicopter swiftly while guiding its movement in the direction the operator wishes to go. The controller provides power to the drive motor via the throttle switch. The drive motor turns the gearbox which, in turn, rotates the axle shafts, assuming that a neutral hub is not in the neutral position.

The lift switch preferably activates the linear drive motor and moves the pivoted portions of the frame toward a straight position. This action in turn lifts the pickup head in an upward direction to pick up the helicopter. Instead of a linear drive motor, other known mechanical components such as a hydraulic cylinder may be substituted. Preferably, a scissor-lift jack or similar manually operated component is also provided to allow for the arm to be lifted or lowered manually in case of a power failure.

Once the lift head has started upward the guide lights are activated, illuminating the bottom of the helicopter so the operator can, in a mirror, see the position the head under the helicopter ground-handling ball without bending over to see the bottom of the helicopter. The guide lights also preferably provide light spots on the load surrounding a location where the lift head will contact the load. Once the lift head contacts the load, a switch is activated to engage the linear motor of the sliding locking gate. The movement of the linear actuator moves a pivot arm which in turn slides the gate to the ground-handling ball to lock it in whichever socket of the bees hive head it may set in. Now the drive wheels are engaged again to move the helicopter to its desired location, and the apparatus is disengaged from the helicopter in the reverse order.

The present invention has many optional features that prior art devices did not have, including, but not limited to: (a) the "bees hive" pickup head; (b) a positionable operating handle; (c) easy disassembly for transport; (d) automatic neutral drive system; and (e) manual movement capability. A manual scissor jack is preferably mounted at the front of the frame for manual lifting operation if needed.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DESCRIPTION OF THE DRAWINGS

FIG. 1 is a side elevation view of the apparatus in use.
FIG. 2 is a side elevation view of the apparatus.
FIG. 5 is a top plan view of the lift head.
FIG. 6 is a cross-sectional view taken on line 6-6 of FIG. 5.
FIG. 7 is a detailed elevation view of the neutral hub.
FIG. 8 is a perspective view of spring associated with the neutral hub.

FIG. 9 is an exploded perspective view illustrating the locking gate assembly.

DETAILED DESCRIPTION OF THE INVENTION

Figure 3:
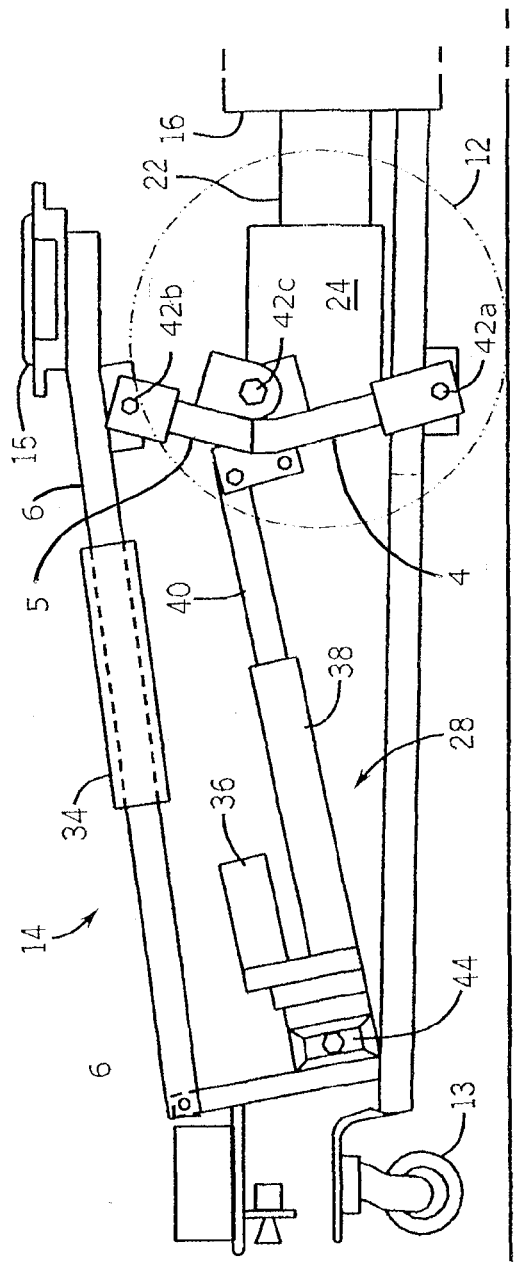
FIG. 3 is a detailed side elevation view of the lift mechanism in a raised position.

FIG. 1 is a side view of the apparatus 10 lifting a helicopter 2. The pickup assembly 15 at a terminal end of the lift arm 6 is engaging a lower portion of the helicopter 2. The frame 3 is shown with casters 13 at either end thereof. The lift means 14 is disposed at a first end of the frame 3, and a handle 30 is disposed at a second end. Between the two ends of the frame is at least one drive wheel 12. Not all of the lift means 14 can be seen in FIG. 2, but it shows the lift actuator 28.

Certain portions of the electronics of the apparatus can be seen in FIG. 1. It shows the batteries 16. Not part of the electrical system but mounted so that it rests above the batteries 16 in the configuration shown is a mirror 17. The mirror 17 allows a user to see the underside of the helicopter while standing upright. The control panel 35a is disposed near a terminal end of the handle 30. A throttle 35b is shown nearer the terminal end of the handle 30 than is the control panel 35a. Another component shown is the pivot release trigger 31, which actuates the pivot lock pin 33 to allow a user to adjust the positionable handle 30 to the best position. Actuation of the pivot lock pin 33 may be either mechanical or electrical.

FIG. 2 also shows a side view of the apparatus 10, but it does not show the apparatus adjacent to a helicopter 2. Instead, FIG. 2 provides shadow lines to show the components, primarily parts of the lift means 14, hidden behind the drive wheel 12 in FIG. 1. Components shown with shadow lines include the gearbox 24, which serves to transfer power from the motor 22 to the drive wheel 12. Also shown is the automatic hub neutral component 26. Also shown in shadow lines are the first and second lift members 4 and 5, respectively. In cooperation with the lift actuator mechanism 28, the first and second lift members 4 and 5 pivot to lift or lower the pickup assembly 15.

The batteries 16 are shown in partial cutaway revealing an electronic controller 18 and a circuit breaker box 20. The mirror 17 can also be seen above the batteries 16.

The handle 30, in a preferable embodiment, can be adjusted to a middle position in line with the body of the frame 3. It can also be adjusted to a position offset to the users' left or right of this center position. The components that accomplish this positionable handle 30 operation are a pivot pin 32 and a pivot lock pin 33. The handle pivots about the pivot pin 32. A plurality of holes are drilled into the frame 3, and the pivot lock pin 33 is adapted to pass through those holes and through a cooperating hole drilled in the handle itself. In cooperation, these components allow a user to disengage the lock pin 33, adjust the handle 30 to a desired location, then to pass the lock pin 33 through the holes to affix the handle 30 in place during operation.

The lock actuator 34 is disposed above the lift actuator 28 and relatively parallel thereto. As can be seen in more detail in FIG. 9, the lock actuator operates the locking gate 48 to releasably engage a pickup ball affixed to an underside of a helicopter 2. See, for example, FIG. 9, which shows the pickup ball 76.

Figure 4:
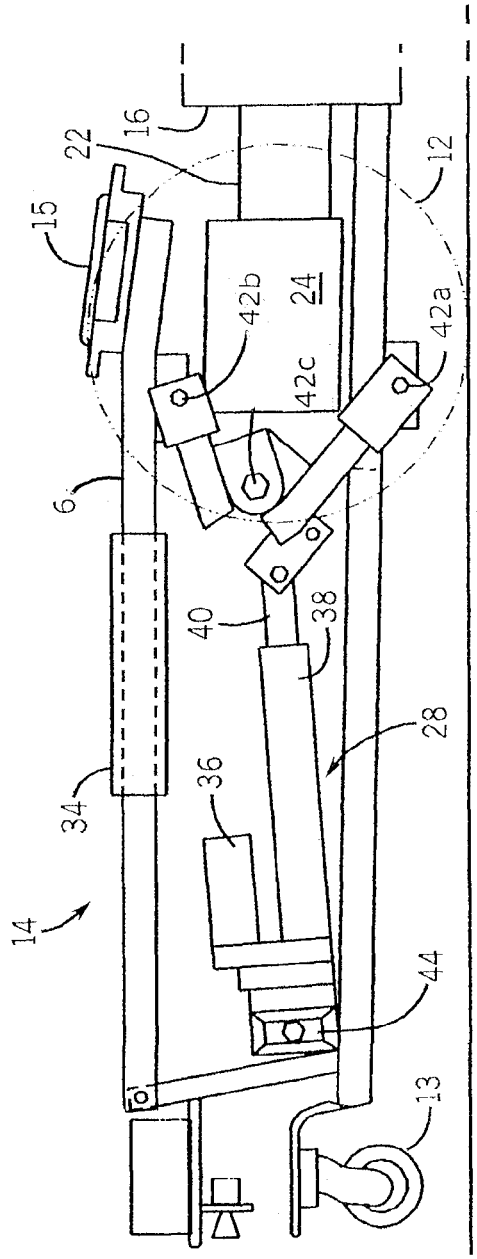
FIG. 4 is a detailed side elevation view of the lift mechanism in a lowered position.

FIGS. 3 and 4 show the lift means 14 in raised and lowered positions, respectively. The lift means 14 is usually powered by a lift actuator 38 located along the lift arm 6. Power for the lift actuator 38 is provided by a lift motor 36. As the actuator 38 extends or retracts the rod 40, it operates against first and second lift members 4 and 5, respectively, which are pivotally connected to the frame 3 and the lift arm 6, respectively by pivot points 42a and 42b. A central pivot point 42c rotatably joins the first and second lift members 4 and 5. A manual jack 44 is shown to operate the lift means 14 if the electronic components fail to operate or if power is unavailable. It can be seen that the rod 40, when it is an extended position as shown in FIG. 3, causes the pickup assembly 15 to be in an elevated position. Conversely, when the rod 40 is in a retracted position shown in FIG. 4, the pickup assembly 15 is in a lowered position.

FIGS. 5, 6 and 8 show the details of construction of one implementation of the pickup assembly 15. FIG. 5 shows a top view of the pickup assembly 15. The pickup head frame 45 surrounds and supports the pickup head 46. The pickup head 46 incorporates a plurality of sockets 50, each of which is adapted to receive a ball mounted to the bottom of a load. The provision of a plurality of sockets 50 allows the apparatus to receive the ball without requiring the same level of navigational precision as would be required if there were only one socket.

Once a ball is seated in one of the sockets 50, a user preferably engages the locking gate 48. Defined in the locking gate 48 are notches 52 adapted to engage a shoulder of a ball mounted on the underside of a helicopter. Once the notches 52 engage the shoulder of a ball as the locking gate 48 closes, thereby holding the ball in secure engagement with the pickup assembly 15. Preferably the pickup assembly 15 has at least one spot lamp 54 incorporated for shining light on the underside of a helicopter to accomplish one or both of the following objectives: to facilitate operation in the dark; and/or to provide marker spots on the load to allow a user to accurately position the apparatus before raising the pickup assembly 15 to engage the load.

FIG. 6 shows the pickup assembly 15 cross-section along line 6-6 from FIG. 5. The pickup assembly includes the pickup head 46 in which are defined a plurality of sockets 50. The pickup head 46 is supported by the lift arm 6 which is connected to the pickup head base 7. The locking gate 48 is seen from the side along with the notches 52 defined therein. The locking gate 48 is slidingly retained within the head frame 45.

FIG. 9 shows many of the components of the pickup assembly 15 in an exploded perspective. The pickup head base 7 can be seen, and it is, in operation connected to the lift arm 6. The lock actuator 34 includes a lock actuator shaft 8 which can be extended or retracted into the lock actuator 34. At a terminal end of the lock actuator shaft 8 is a hole adapted to receive a bolt 74 which, in cooperation with a nut 72a, rotatingly affixes the lower actuating arm 70 at a first end thereof to the lock actuator shaft 8. At another end of the lock-actuating arm 70, it passes rotatingly around a actuating stud 55. The actuating stud 55 also passes through a torsion spring 68, and an upper actuating arm 66, in that order. The foregoing components are held on the actuating stud 55 by a bolt 72b. The actuating arm is rotatingly affixed at a first end to the stud 55, and on the other end, a pin 67 is disposed and adapted to pass upwardly through a slot 49 defined in the locking gate 48.

In operation, lengthening movement of the shaft 8 causes the lower actuating arm 70 to move, and more particularly, causes a projection 71 therefrom to operate against an actuating plate 65 affixed to the upper actuating arm 66. The cooperative action of these components causes the locking gate 48 to move in an opening direction. Shortening movement of the shaft causes the release of pressure, and the spring 68 causes the locking gate 48 to bias in a closed direction.

FIGS. 7 and 8 illustrate components associated with the neutral hub 26. A hub 56 is disposed around the axle 58. The hub 56 defines a plurality of teeth 57 around its circumference. These teeth 57 are adapted to engage a pivoting lug 60 pivotable about a pin 62. In the position shown, the lug 60 is not engaged with the teeth 57, so the hub 56 is free rolling, rather than in powered operation. Rotating the lug 60 into contact with the teeth 57 is engaged by the powered operation of the apparatus 10.

The spring 64 shown in FIG. 8 clampingly and rotatingly engages a rod adjacent to the biasing pin 61 shown in FIG. 7. Extending out perpendicular to the rod is the spring pin receiver 63. The biasing pin 61 then is received within the spring pin receiver 63. In operation, when the apparatus 10 is pushed or pulled manually by an operator, the pivoting lug 60 disengages the teeth 57 allowing the hub 56 to rotate freely. This enables an operator to easily push or pull the apparatus 10, which is a useful feature to save battery life while moving the apparatus around without any load. However, in powered operation, the rotation of the axle causes the combined operation of the biasing pin 61 in the spring pin receiver 63 to swing the lug 60 into driving engagement with the teeth 57.

The purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

While the invention has been shown, illustrated, described and disclosed in terms of specific embodiments or modifications, the scope of the invention should not be deemed to be limited by the precise embodiments or modifications therein shown, illustrated, described or disclosed. Such other embodiments or modifications are intended to be reserved especially as they fall within the scope of the claims herein appended.

Having thus described the invention, I claim:

1. An apparatus for moving a wheeled load comprising:
   a. a frame having a first end and a second end;
   b. at least one steadying wheel means for improving stability of the apparatus;
   c. at least one drive wheel disposed between the ends;
   d. a drive means for providing power to at least one drive wheel;
   e. a power source;
   f. a lifting arm means for lifting at least a portion of the load;
   g. affixed to a distal end of the lifting arm means is a pickup head having a multi-socket center adapted to receive a ball affixed to the load;
   h. extending outwardly from the second end is an operating handle;
   i. disposed on the operating handle is a control means for operating the apparatus including engaging and disengaging the pickup head, lifting and guiding the load, and disengaging the drive apparatus, as needed for manual movement of the load; and
   j. drive disengagement means for mechanically disengaging the powered driving mechanism so that a user can manually move the apparatus in case of battery or other mechanical failure.

2. The apparatus of claim 1, the operating handle having an adjustment means for allowing a user to operate the apparatus on either side or in front of the load, whereby, the operator can position themselves for the best view point to see any obstacles to safely move the load.

3. The apparatus of claim 1, the pickup head having a locking means for releasably engaging a ball in a socket.

4. The apparatus of claim 1, further including a manual lift means for providing manual power to lift the load.

5. The apparatus of claim 1 further having on the pickup head a lighting means for illuminating and guiding operation of the pickup head.

6. The drive disengagement means of claim 1 further defined as an outer hub rotatingly disposed around an axle, the outer hub having teeth protruding inwardly; a pivoting lug pivotable about a pin into a first position in which the lug is not engaged with the teeth, so the hub is free rolling, and a second position in which the lug contacts with the teeth; a spring clampingly and rotatingly engaging a rod adjacent to a biasing pin received within a spring pin receiver defined on the spring, whereby when the apparatus is pushed or pulled manually by an operator, the pivoting lug disengages the teeth allowing the hub to rotate freely, but in powered operation, the rotation of the axle causes the combined operation of the biasing pin in the spring pin receiver to swing the lug into driving engagement with the teeth to transmit power to a wheel.

7. An apparatus for moving a wheeled load comprising:
   a. a frame supported by at least one wheel;
   b. a power source;
   c. at least one motor adapted to provide power for operation of the apparatus;
   d. a load-lifting arm means for providing lift force to the load;
   e. affixed to the arm means is a locking pickup head having a multi-socket center adapted to receive a ball affixed to the load, and a sliding locking gate adapted to releasably affix the head to the ball;
   f. an operating handle;
   g. disposed on the operating handle is a control means for operating the apparatus; and
   h. drive disengagement means for mechanically disengaging the powered driving mechanism so that a user can manually move the apparatus;
   i. a manual lift means for providing optional manual power to lift the load;
   j. on the pickup head a lighting means for illuminating and guiding operation of the pickup head.

8. An apparatus for moving a wheeled load comprising:
   a. a frame supported by at least one wheel;
   b. a power source;
   c. at least one motor adapted to provide power for operation of the apparatus;
   d. a load-lifting arm means for providing lift force to the load;
   e. affixed to the arm means is a locking pickup head having a multi-socket center adapted to receive a ball affixed to the load, and a sliding locking gate adapted to releasably affix the head to the ball;
   f. an operating handle;
   g. disposed on the operating handle is a control means for operating the apparatus; and
   h. an outer hub rotatingly disposed around an axle, the outer hub having teeth protruding inwardly; a pivoting lug pivotable about a pin into a first position in which the lug is not engaged with the teeth, so the hub is free rolling, and a second position in which the lug contacts with the teeth; a spring clampingly and rotatingly engaging a rod adjacent to a biasing pin received within a spring pin receiver defined on the spring, whereby when the apparatus is pushed or pulled manually by an operator, the pivoting lug disengages the teeth allowing the hub to roll freely, but in powered operation, the rotation of the axle causes the combined operation of the biasing pin in the spring pin receiver to swing the lug into driving engagement with the teeth to transmit power to a wheel;
   i. a manual lift means for providing optional manual power to lift the load;
   j. on the pickup head a lighting means for illuminating and guiding operation of the pickup head.

\* \* \* \* \*